Dec. 19, 1944.  C. E. WYRICK  2,365,317
TYPEWRITER CONTROLLER
Original Filed Aug. 13, 1941   9 Sheets-Sheet 3
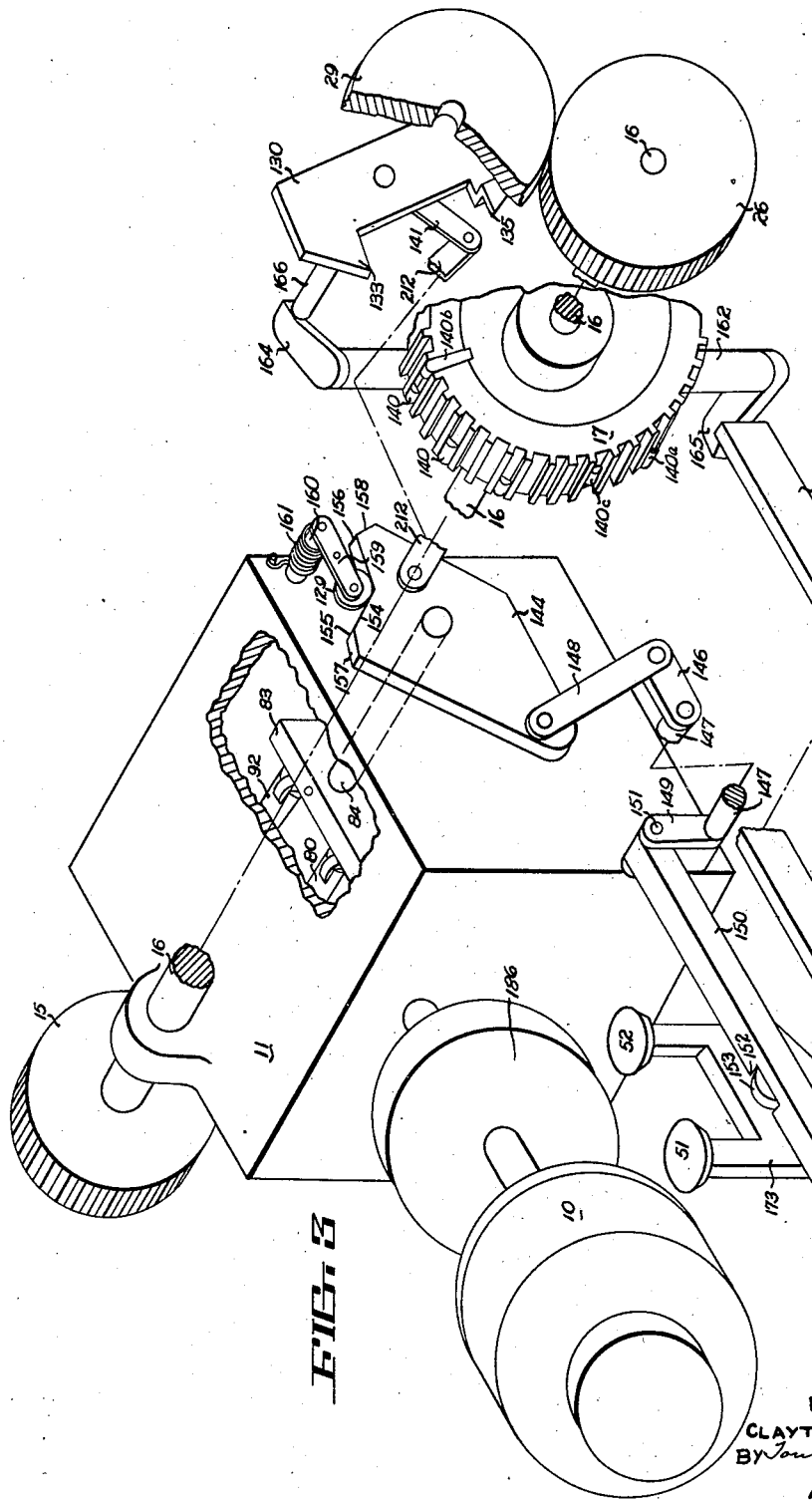
INVENTOR
CLAYTON E. WYRICK
BY
ATTORNEYS

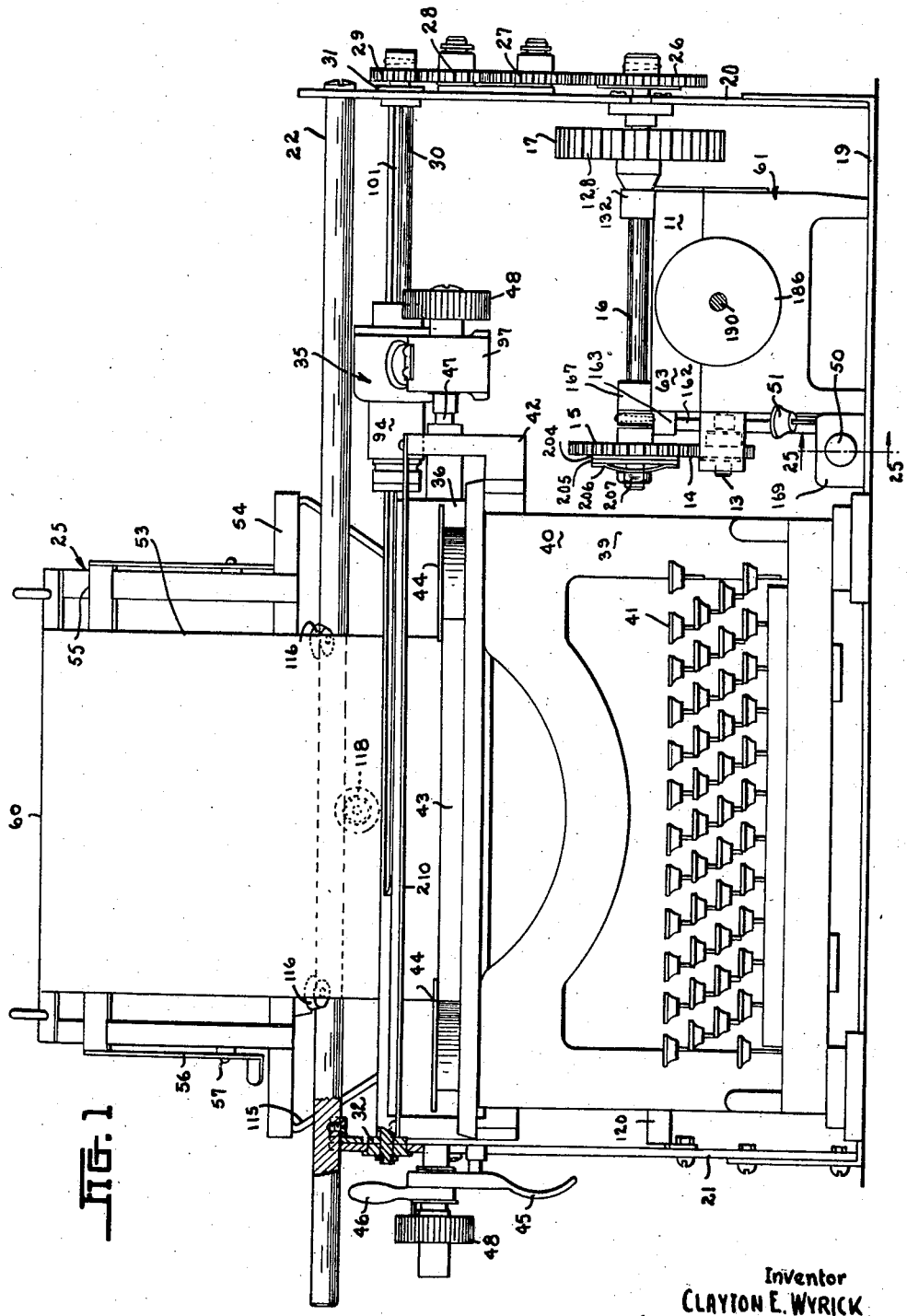

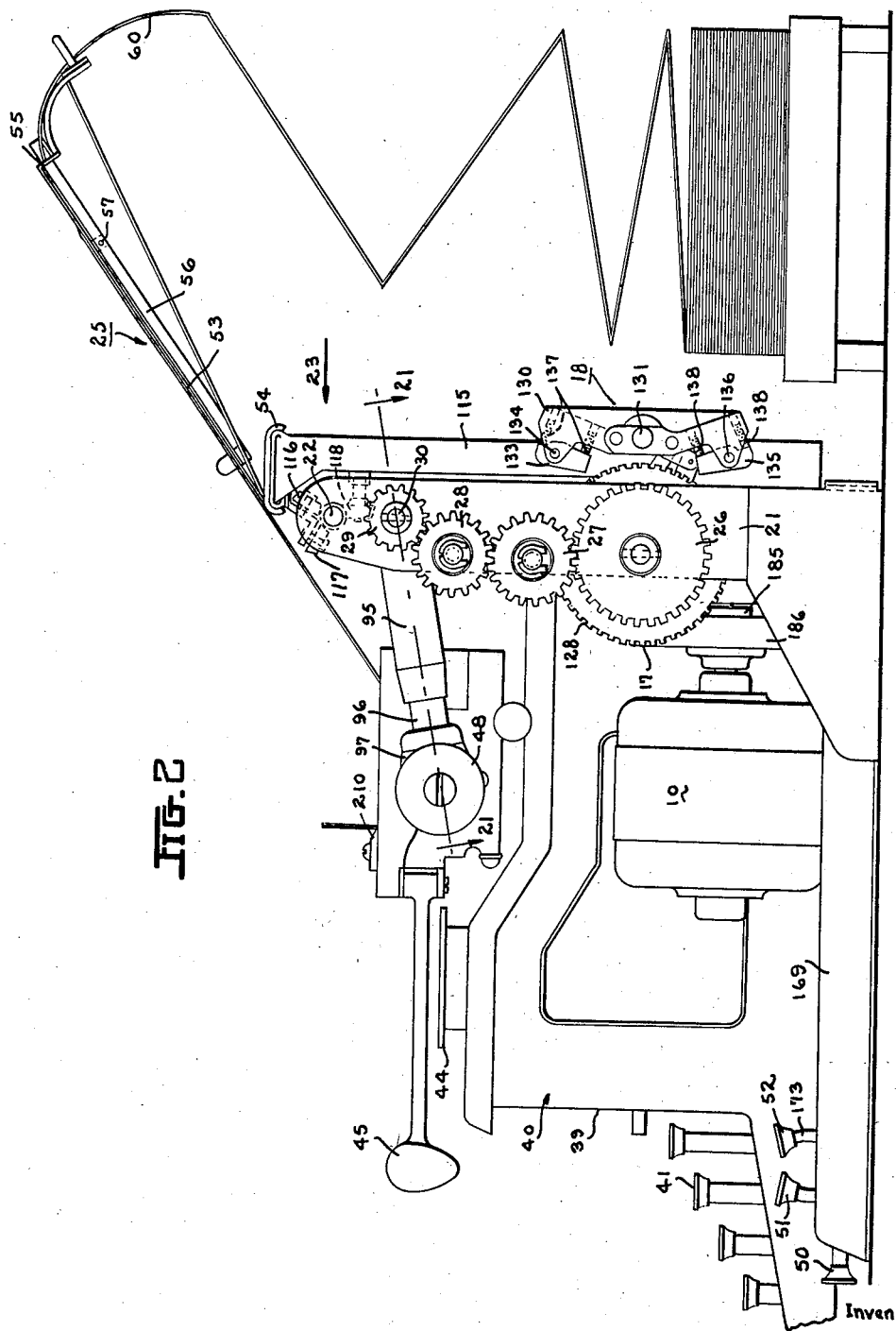

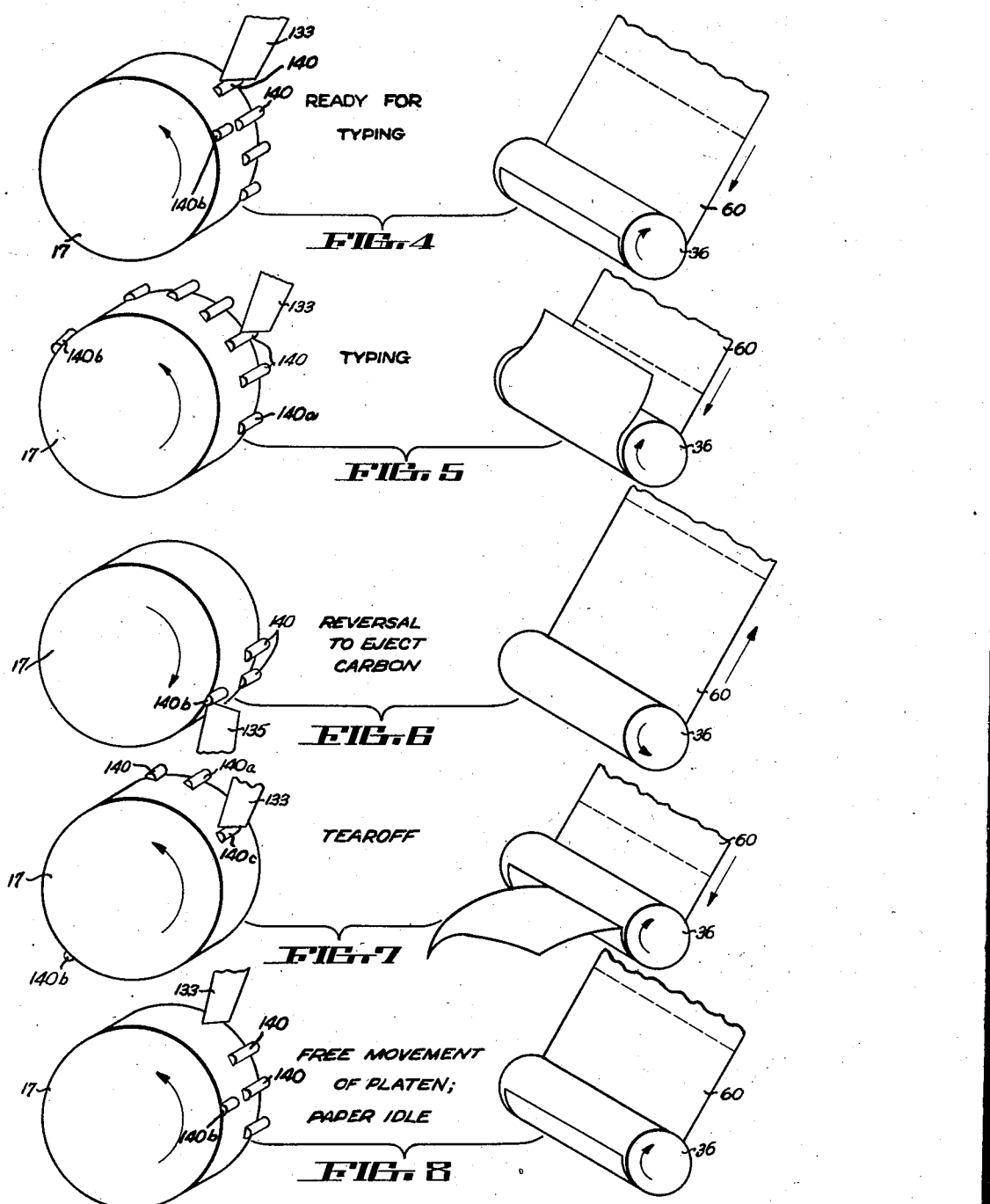

Dec. 19, 1944.        C. E. WYRICK        2,365,317
TYPEWRITER CONTROLLER
Original Filed Aug. 13, 1941    9 Sheets-Sheet 5
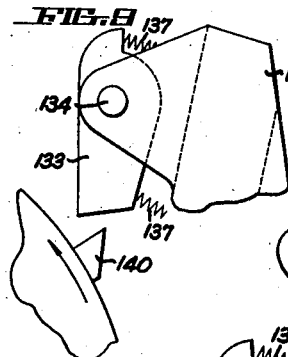
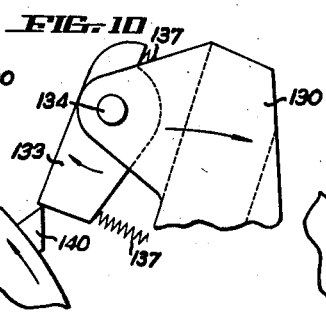
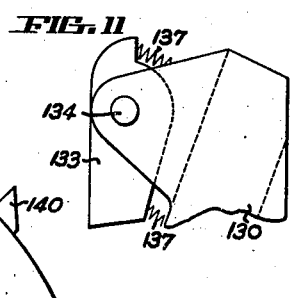
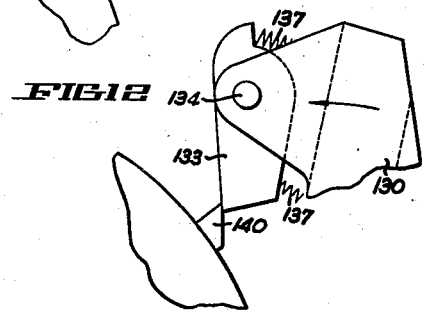
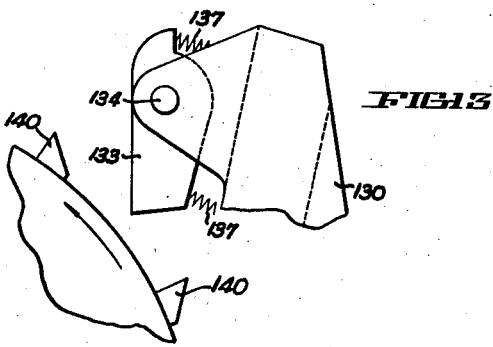
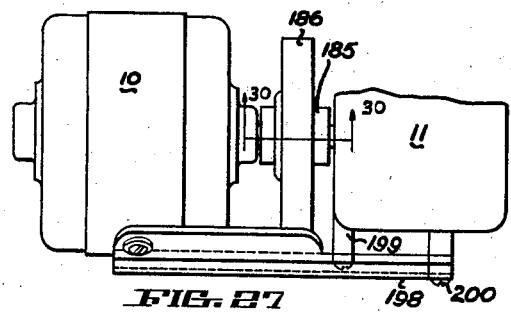
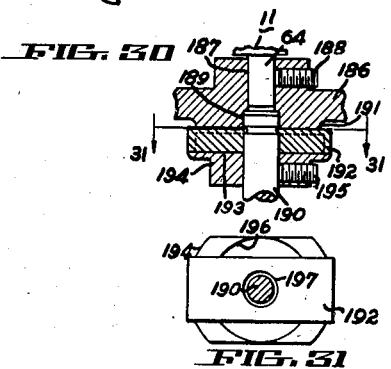
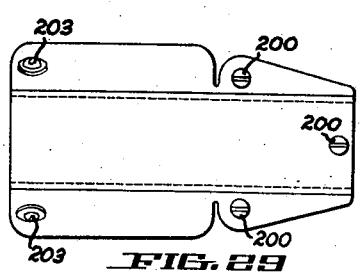
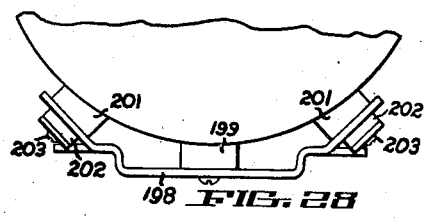
inventor
CLAYTON E. WYRICK
By Toulmin & Toulmin
attorneys Dec. 19, 1944.   C. E. WYRICK   2,365,317
TYPEWRITER CONTROLLER
Original Filed Aug. 13, 1941   9 Sheets-Sheet 6
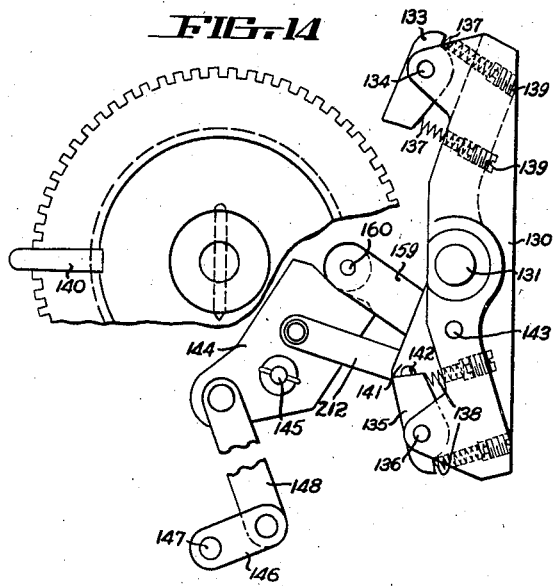
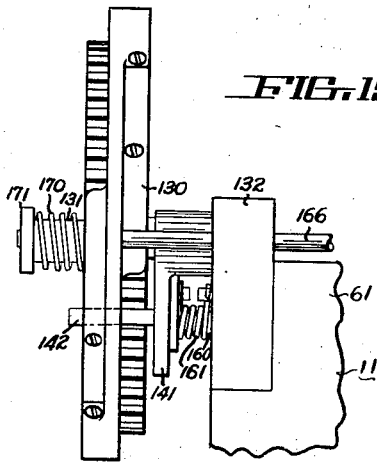
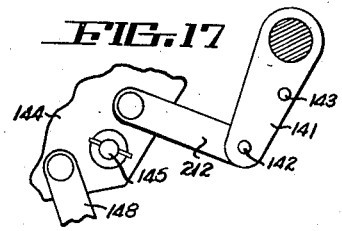
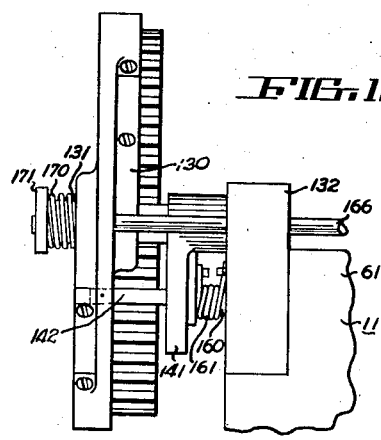
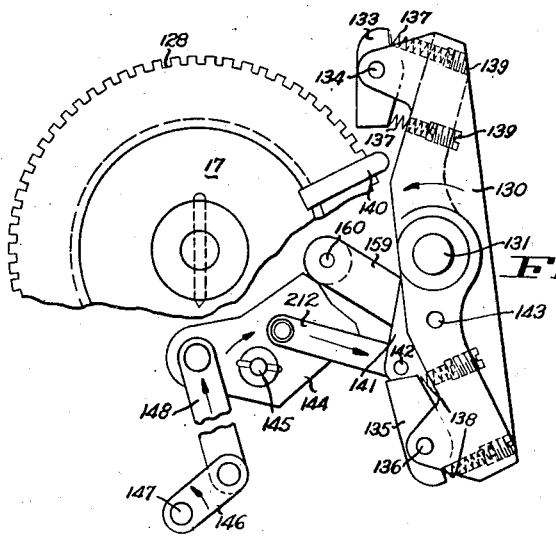
INVENTOR
CLAYTON E. WYRICK
BY
ATTORNEYS

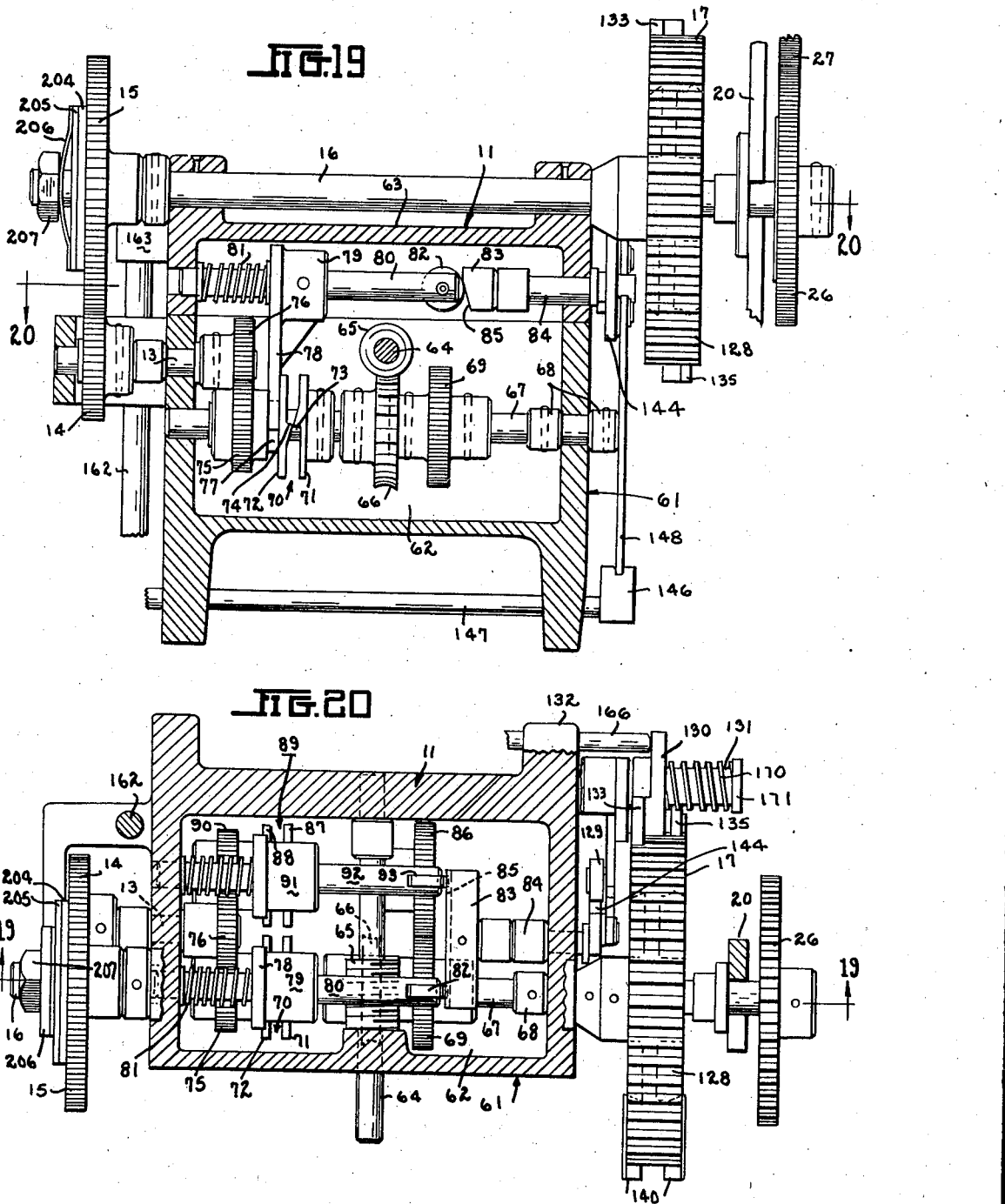

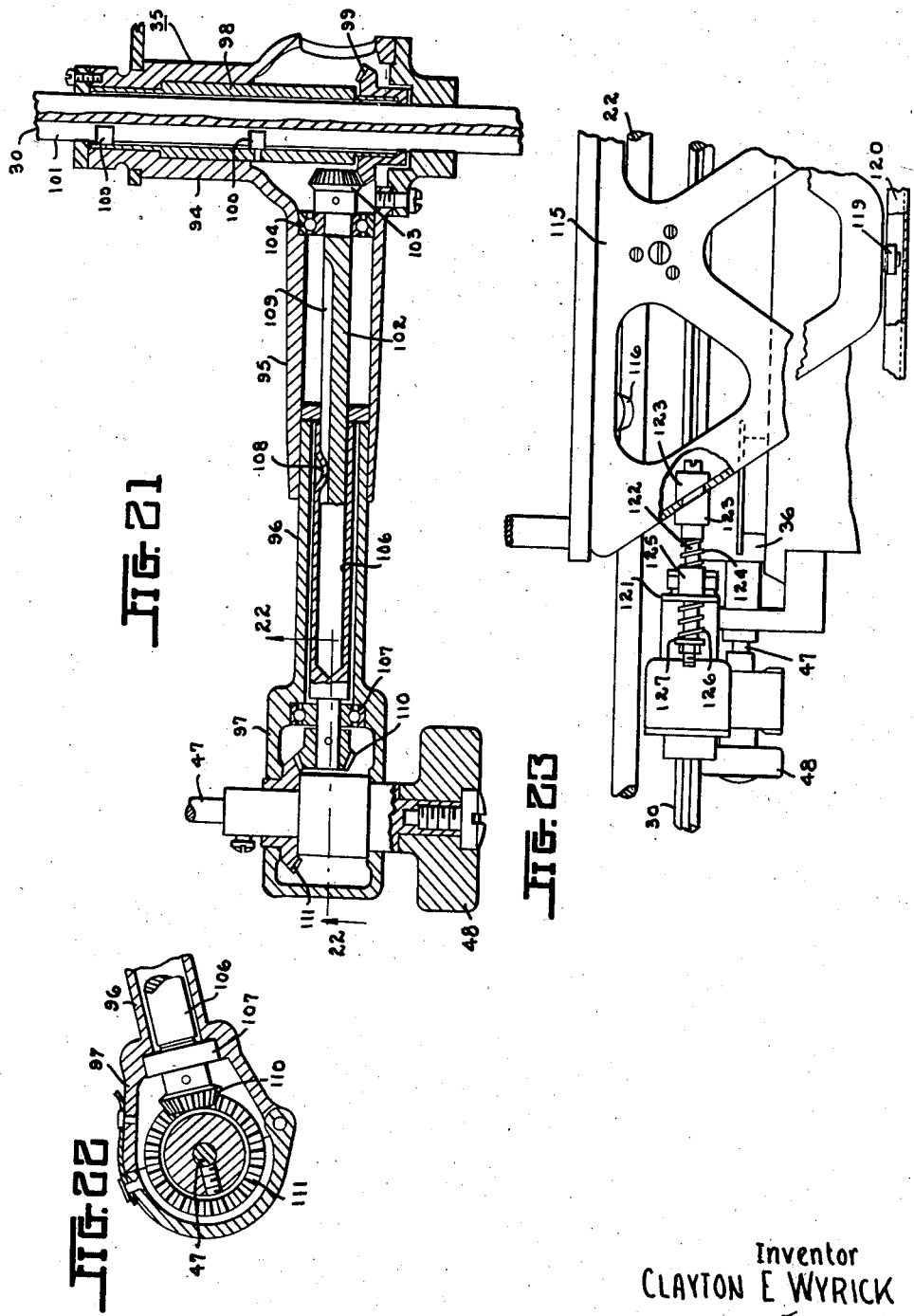

Dec. 19, 1944  C. E. WYRICK  2,365,317
TYPEWRITER CONTROLLER
Original Filed Aug. 13, 1941   9 Sheets-Sheet 9
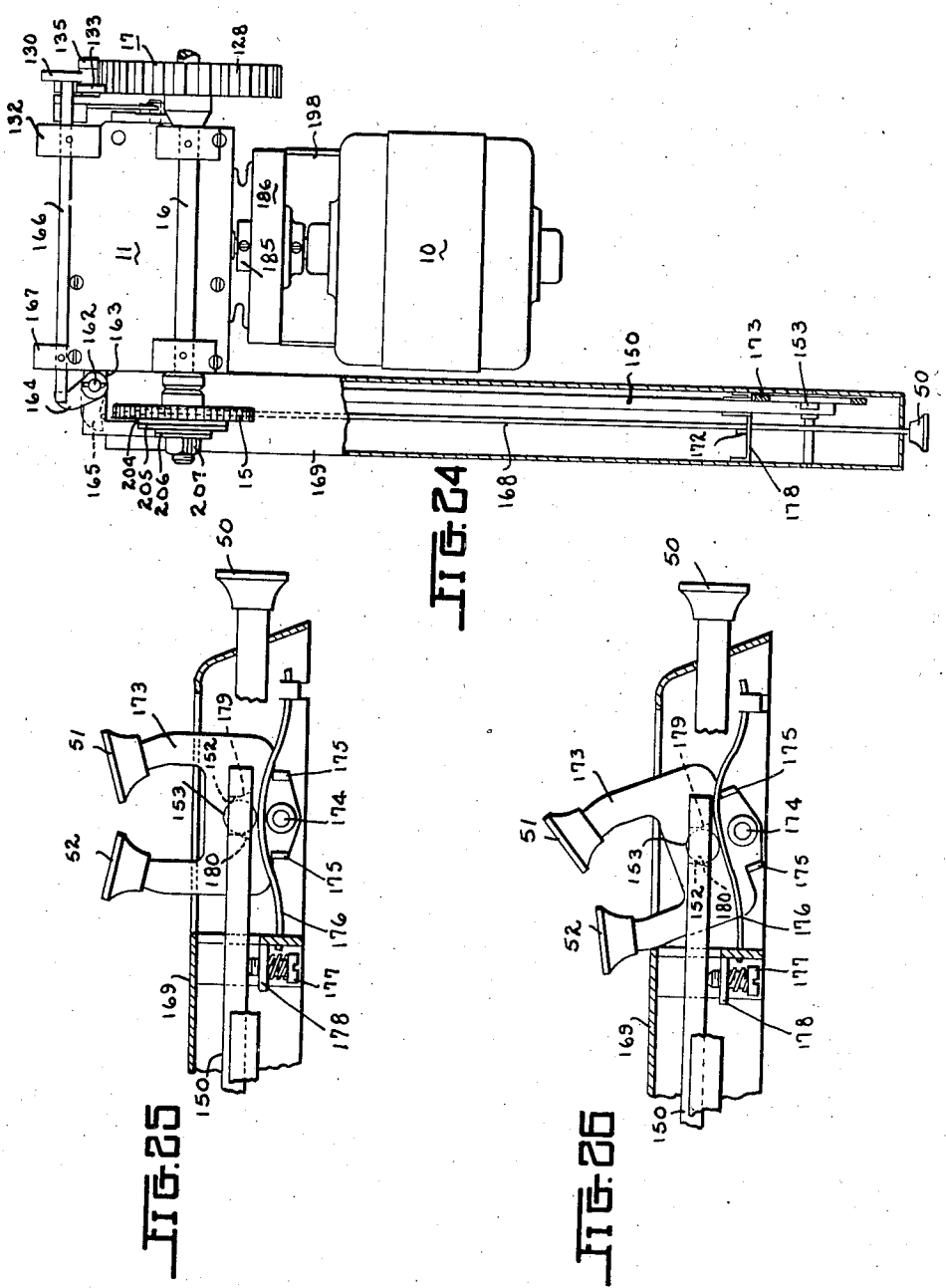
Inventor
CLAYTON E. WYRICK
by Toulmin & Toulmin
Attorneys Patented Dec. 19, 1944

2,365,317

UNITED STATES PATENT OFFICE 2,365,317

TYPEWRITER CONTROLLER

Clayton E. Wyrick, Miami, Fla., assignor to The Egry Register Company, Dayton, Ohio, a corporation of Ohio Original application August 13, 1941, Serial No. 406,623. Divided and this application July 13, 1942, Serial No. 450,698

13 Claims. (Cl. 197—126)

This invention relates to an apparatus adapted to be associated with a typewriter for providing a sensitive power-driven motion to the platen of the typewriter for line spacing and for running paper sheets in and out of the typewriter. The invention is particularly adaptable for moving a continuous web of repeated forms through the typewriter which has sheet carbon associated with the forms which is to be removed from between the forms after the same has been completely typed so that the typed form can be removed from the continuous web and the carbon reused for typing the next successive form.

An object of the invention is to provide an apparatus adapted to be associated with a conventional typewriter for feeding continuous webs of repeated forms through the typewriter and to power drive the platen of the typewriter for line spacing of the forms.

Another object of the invention is to provide a mechanism adapted to be associated with a conventional typewriter for feeding a continuous web of repeated forms through the typewriter which web has associated therewith sheet carbon adapted to be reused between successive forms, the mechanism being constructed and arranged to advance the continuous web through the typewriter with the sheet carbon for a typing operation and to reverse the motion of the web to release the sheet carbon between the adjacent sheets of the continuous web, to permit the web to again advance while the carbon remains stationary, and thereby permit the typed form to be removed from the continuous web.

Another object of the invention is to provide a power mechanism for driving the platen of a typewriter, for positioning the platen for line spacing and for locating the web carried through the typewriter by the platen in a predetermined relationship to a cutting edge for permitting the typed form upon the web to be removed therefrom.

Another object of the invention is to provide a typewriter controller having a carbon feeder associated therewith, which combination of mechanism is associated with a conventional typewriter in a manner that the typewriter controller automatically operates the platen of the typewriter to position a continuous fan fold form in proper relationship within a typewriter for typing the form and for reversing the motion of the fan fold form to release sheet carbon provided therebetween so that the fan fold form can again be advanced to a tear off line and be removed from the continuous web.

Another object of the invention is to provide a typewriter controller for driving the platen of a typewriter adapted to line space forms within the typewriter and to position the forms with respect to a tear off blade to permit each of the forms to be removed from a continuous web of forms at the proper tear off line.

It is another object of the invention to provide a typewriter controller for automatically driving the platen of a typewriter which is extremely sensitive in its action and positive in the proper positioning of fan fold forms or continuous repeated forms within a typewriter for identical line spacing upon each of the forms.

Another object of the invention is to provide a typewriter controller which can be pre-set for typing upon particular lines of a continuous web of repeated forms.

It is another object of the invention to provide a power mechanism for driving the platen of the typewriter having associated therewith a sheet carbon handling device which is adapted to move the paper webs associated with the sheet carbon handling device in a manner to permit the sheet carbon to be removed between each of the forms prior to tearing the form from the continuous web of repeated forms.

It is another object of the invention to provide a power driven mechanism for driving the platen of the typewriter which controls general forward and reverse rotation of the platen as well as line spacing by the platen in response to the operation of push button controls.

Another object of the invention is to provide a typewriter controller for operating the platen on the typewriter which will automatically position repeated forms in a predetermined position within a typewriter and will automatically line space each of the forms at identical line spaces, said mechanism being controlled by means of push buttons.

Another object of the invention is to provide a control mechanism which is initiated in operation by manual control and has the operation thereof automatically stopped at predetermined positions, each of the automatic stops in the operation of the device occurring in a predetermined sequence, which sequence of operation stops can be identically repeated.

Another object of the invention is to provide a mechanism in accordance with the foregoing object which is adapted to feed a continuous web of repeated forms through a typing machine so that the sequence of operation stops occur at predetermined positions upon the repeated forms, one of which positions is the tear off position for the form.

Another object of the invention is to provide a mechanism in accordance with the foregoing object having means for pre-setting the sequence of operation stops, which sequence can be changed as needed.

Another object of the invention is to provide a controlling mechanism for operating the platen of a typing machine having a carbon feed or handling device associated therewith which is carried in a transverse motion with respect to the typing machine by means of the platen controlling device.

Another object of the invention is to provide a mechanism in accordance with the foregoing object wherein the carbon handling device is floated upon frictionless bearings and is provided with an apparatus which absorbs the shock of carriage movement of the typing machine.

Another object of the invention is to provide a mechanism built in accordance with any of the foregoing objects wherein the normal manual operation of the platen of the typing machine is not interfered with, yet the manual operation of the platen will not effect the predetermined positioning of the paper web within the typing machine by means of the automatic platen operating mechanism.

Another object of the invention is to provide a mechanism built in accordance with any of the foregoing objects wherein forms of the various lengths may be used.

Another object of the invention is to provide a sensitive clutch mechanism for a typing machine platen control device.

Another object of the invention is to provide a clutch mechanism for a typing machine control device which requires a minimum amount of movement of the operating mechanism to thereby increase its sensitivity.

Another object of the invention is to provide a clutch mechanism in accordance with the foregoing object which has a power output for either advancing or reversing the rotation of the platen of the typing machine.

Further objects and advantages will become apparent from the following description and the drawings.

In the drawings:

Figure 1 is a front elevational view of a typewriter having the mechanism of this invention associated therewith but has the motor of the mechanism removed to permit a more satisfactory showing of the mechanism.

Figure 2 is a side elevational view of a typewriter showing the mechanism of this invention associated therewith.

Figure 3 is a simplified view of the essential elements of the mechanism to more clearly represent the operative relationship of the various parts.

Figures 4 to 8 inclusive are simplified diagrammatic views of the line spacing control shown in various steps of operation.

Figures 9 to 13 inclusive are diagrammatic simplified showings of the line spacing control mechanism and the manner of its operation with respect to the line spacing stops on the line spacing control member.

Figure 14 is a side elevational view of a portion of the control mechanism showing one position in the operation of the line spacing control member.

Figure 15 is an end elevational view taken in the direction of the arrow 15 of Figure 14.

Figure 16 is a view similar to Figure 14 showing another position in the operation of the line spacing control device.

Figure 17 is an elevational view of a portion of a mechanism shown in Figures 14 and 16 to illustrate the connection between the cam operating member of the control mechanisms to control movement of the rocker arm carrying the pawl mechanisms associated with the line spacing control member.

Figure 18 is an end elevational view similar to Figure 15 but showing the rocker arm carrying the pawl mechanisms shifted to the carbon tear off position so that the upper pawl aligns with the circumferential center line of the spacing control member.

Figure 19 is a vertical cross-sectional view of the clutch mechanism taken substantially along line 19—19 of Figure 20.

Figure 20 is a horizontal cross-sectional view of the clutch mechanism taken substantially along line 20—20 of Figure 19.

Figure 21 is a cross-sectional view of the drive mechanism interconnecting the control device with the platen of the typewriter taken substantially along line 21—21 of Figure 2.

Figure 22 is a cross-sectional view taken substantially along line 22—22 of Figure 21.

Figure 23 is a rear elevational view of the mechanism taken in the direction of the arrow 23 of Figure 2, showing the interconnection between the carbon feeding device and the platen controlling mechanism for absorbing the shock of motion of the typewriter carriage.

Figure 24 is a top plan view, partially in cross section, showing the association between the driving clutch, the motor and the push button controls.

Figure 25 is a cross-sectional view taken along line 25—25 of Figure 1 showing the push button controls.

Figure 26 is a view similar to Figure 25 showing one position in the operation of the push button controls.

Figure 27 is a side elevational view of the motor and clutch of the platen control device showing the manner of mounting these elements.

Figure 28 is an end elevational view of the motor and mounting plate for the same showing the manner of mounting the motor upon the plate.

Figure 29 is a bottom elevational view of the mounting plate for the motor and clutch.

Figure 30 is a cross-sectional view taken along line 30—30 of Figure 27 showing the coupling between the motor shaft and the clutch shaft.

Figure 31 is a cross-sectional view taken along line 31—31 of Figure 30.

The apparatus of this invention is adapted to be associated with a conventional typewriter for driving the platen of the typewriter in a manner to position the paper web carried through the typewriter by the platen in predetermined preselected positions having a predetermined sequence and to repeat the sequence upon a subsequent portion of the web, the apparatus thereby providing means for typing information upon a continuous web of repeated forms. The apparatus is in the nature of an attachment which can be associated with any conventional typewriter, it being necessary to only add a suitable gearing mechanism upon one end of the platen of the typewriter to permit the same to be driven by the mechanism of this invention.

Referring to Figures 1 and 2, the typing machine platen control of this invention consists of a driving motor 10 connected to a clutch mechanism 11 through means of a coupling 12. The clutch 11 has a power output shaft 13 having a gear 14 which meshes with a gear 15 keyed upon a counter shaft 16. A line spacing and sheet length control member 17 is mounted upon the shaft 16 and has associated therewith a stop control 18 for regulating the degree of rotation of the line spacing and sheet length control member 17.

The aforementioned mechanism is carried upon a frame consisting of a base member 19 having vertical side frames 20 and 21. The side frames 20 and 21 extend in an upwardly direction and are tied together adjacent the top edges thereof by means of the tie bar 22 which also serves to support a sheet carbon handling device 25. The shaft 16 has a gear 26 mounted upon the end thereof opposite to the gear 15, which gear 26 is associated with the gear train consisting of the gears 27, 28 and 29. The gear 29 is mounted upon the end of a shaft 30 which is bearinged within the vertical side frames 20 and 21 by means of the bearings 31 and 32 respectively.

A platen driving mechanism 35 is carried upon the shaft 30 and has suitable gearing associated therewith to be hereinafter described for driving the platen 36 of a typing machine 40.

The typing machine 40 is of conventional construction consisting of a frame 39 which carries the keyboard 41. The frame 39 supports a transversely movable carriage 42 which in turn supports the platen 36. A type ribbon 43 is provided adjacent the platen 36 in conventional manner and is supported by the spools 44. The usual spacing bar 45 is provided for manually rotating the platen 36 while the paper release for the pressure rollers which retain the paper in engagement with the platen 36 is operated by means of the lever 46 in the conventional manner. The end of the shaft 47 carrying the platen 36 is provided with knurled knobs 48 for manually rotating the platen 36 when desired.

Operation of the clutch 11 is controlled by means of the push buttons 50, 51 and 52 for initiating actuation of the clutch mechanism to drive the platen operating mechanism for rotating the platen for line spacing or for advancing or reversing the motion of the paper within the typing machine. The apparatus of this invention is particularly adaptable for feeding a paper web consisting of a plurality of individual webs in adjacent superimposed relationship through a typing machine for line spacing the web in the machine at predetermined positions and for repeating the identical line spacings as the web is passed through the machine so that typing can be accomplished upon repeated forms upon identical lines as the continuous web is fed through the machine. The carbon handling device 25 for permitting the making of a plural number of copies upon the individual webs is of the type wherein sheet carbon is used. When passing a continuous web of repeated forms through a typing machine and when using said carbon for duplication of copies, it is necessary that the paper web and carbon shall be simultaneously fed into the machine for typing purposes. After the typing has been completed upon one of the forms the paper web and the carbon sheets must be backed out of the machine so that the carbon sheets will be engaged by suitable mechanism of the carbon handling device 25 to prevent the same from advancing into the machine when the paper webs are again advanced to a position which permits one of the forms to be torn from the continuous web. Carbon handling devices for handling sheet carbon in this manner are well-known and a simplified form of such a device is shown associated with the platen control device of this invention.

The carbon handling device consists of a table 53 carried upon a bracket 54 and angularly disposed with respect to the same. The upper end of the table 53 is provided with a recess 55 into which the rods extending through a loop provided in the end of the carbon sheets are adapted to fall when the upper edge of the carbon sheet is adjacent the recess 55. As long as the rods cooperating with the carbon sheets are in the recess 55 the sheets cannot advance when the paper web 60 is advanced into the typing machine. A trip lever 56 pivoted at 57 moves the carbon sheet holding rods upwardly to permit the sheets to advance when desired under control of the operator of the typing machine.

A platen operating mechanism adapted to feed a continuous paper web with interleaved carbon sheets of the type heretofore described through a typing machine for form typing upon repeated form faces must be capable of several functions. The first function which must be capable of being performed is line spacing the forms with respect to the type bars of the typing machine in predetermined positions and in a proper sequence while advancing the paper web or form through the machine. This is accomplished by mechanism which will be hereinafter more fully described. The second function occurs after the form face has been completely typed, which function reverses the direction of movement of the paper web and the carbon sheets held between the adjacent sheets of the web to cause the paper web and the carbon sheets to move upwardly along the table 53 of the carbon handling device 25 so that the edges of the carbon sheet holding bars will engage the recess 55. The third function to be accomplished by the platen controlling mechanism is to again advance the paper web through the machine to a position that the bottom edge of the form which was just typed will be adjacent a tear off blade so that the forms may be removed from the continuous web.

A further function of the apparatus consists of permitting the line spacing control member to return to an initial predetermined position for initiating forward advancement of another form through the typing machine. This last function is used when forms of a length shorter than the longest form capable of being handled by the machine are being used. A fifth function is to permit manual rotation of the platen of the typing machine to permit erasure of typographical errors and to return the platen to the proper line without interfering with the sequence of the operation of the line spacing mechanism.

The clutch 11 controls the power connection between the motor 10 and the operating mechanism for driving the platen 36. As shown in Figures 19 and 20 the clutch 11 consists of a casing 61 having a hollow interior 62 within which the clutch mechanism is positioned. The lower portion of the casing 61 is open at the top thereof, which open portion is closed by means of a cover 63. A drive shaft 64 extends transversely of the casing 61 and is suitably bearinged in the walls of the casing. A worm 65 is suitably secured to the drive shaft 64 and engages a worm wheel 66 pinned to a shaft 67 which extends longitudinally of the casing 61. The shaft 67 is provided with collars 68 for positioning the same within the casing 61. A spur gear 69 is pinned to the shaft 67 for integral rotation therewith. A clutch 70 has one element 71 thereof pinned to the shaft 67 while the other element 72 of the clutch 70 is slidably positioned upon the shaft 67.

The clutch element 71 is provided with a tooth 73 while the clutch element 72 is provided with a tooth 74, which teeth are adapted to cooperate so that the clutch element 72 is driven by the clutch element 71 when the teeth 73 and 74 are in engagement thereby driving the gear 75. The gear 75 is in meshing relationship with a gear 76 which is pinned to the output shaft 13 of the clutch 11.

An annular groove 77 is provided in the unit assembly consisting of the gear 75 and the clutch element 72 within which a shifting yoke 78 is positioned. The shifting yoke 78 is carried by a collar 79 pinned upon a shaft 80 adapted to reciprocate longitudinally in order to shift the tooth 72 into cooperating relationship with the tooth 73. A spring 81 is positioned between the collar 79 and a wall of the casing 61 to urge the collar 79 in a rightward direction (as viewed in Figure 19). The end of the rod 80 is provided with a roller 82 which engages a T-bar 83 mounted upon a shaft 84 in the wall of the casing 61.

The T-bar 83 is provided with the cam surface 85 against which the roller 82 is adapted to be positioned. When the T-bar 83 is oscillated by the shaft 84 in the direction of the arrow on the T-bar 83 the cam surface 85 will permit the rod 80 to reciprocate and thus engage the clutch.

The gear 69 of the clutch 11 meshes with a gear 86 (see Figure 20) which is pinned to a shaft positioned in the same horizontal plane with the shaft 67. The gear 86 drives the shaft associated therewith in a reverse direction to the shaft 67 so that the clutch elements 87 and 88 of the clutch 89 will rotate in a reverse direction with respect to the clutch 70. The gear 90 is integral with the clutch element 88 in the same manner as the gear 75 is integral with the clutch element 72. The gear 90 is in meshing relationship with the gear 76 and thus with the output shaft 13. The clutch 89 is shifted by means of a shifting fork carried by the collar 91 actuated by a rod 92 carrying a roller 93 which is in engagement with the T-bar 83 on the end opposite to the point of engagement of the roller 82 with the T-bar 83. The cam surface 85 extends completely across the T-bar 83 and thus in engagement with the roller 93.

The clutch mechanism herein described consists of parts having relatively lightweight and since the clutch teeth of the clutching mechanisms 70 and 89 are in very close relationship when disengaged, it is only necessary that a slight force be imparted to the clutch to actuate the elements. The clutch mechanism also provides a means for driving a power output shaft 13 thereof in either direction of rotation depending upon which clutch, 70 or 89, is in engagement. The clutch mechanism herein described is shifted by means of the push button controls 51 and 52 in a manner which will be hereinafter described.

The output shaft 13 of the clutch 11 transmits power from the motor 10 to the gear 14 which is the first of a series of gears, 15, 26, 27, 28 and 29, comprising a gear train to the shaft 30 whereby the shaft 30 is rotated by means of the power derived from the motor 10. The gears 27 and 28 are suitably bearinged upon the vertical side frame 20, while the gears 29 and 26 are carried upon their respective shafts 30 and 16 (see Figure 1).

A power transmitting mechanism is carried upon the shaft 30 and is adapted to transmit the rotary motion of the shaft 30 to the platen 36. This mechanism (see Figure 21) consists of a housing 94 journaled upon the shaft 30 and adapted to reciprocate upon the shaft in unison with the shifting of the carriage 42 of the typing machine 40. The housing 94 has an extension 95 within which an extension 96 from a housing 97 is adapted to telescope. The housing 97 is journaled upon the platen shaft 47. The telescoping extensions 95 and 96 provide means for transmitting the shifting motion of the carriage 42 of the typing machine 40 to the platen driving mechanism 35. A hollow shaft 98 is journaled within the housing 94 and has a bevel gear 99 suitably secured thereto. The interior of the hollow shaft 98 is provided with a plurality of rollers 100 which engage a keyway 101 provided in the shaft 30. The keyway 101 extends substantially the full length of the shaft 30 to permit the platen driving mechanism 35 to traverse the typing machine 40 the same distance as the carriage 42 thereof. The rotation of the shaft 30 is thus imparted to the bevel gear 99 through the rollers 100 and the shaft 98.

A shaft 102 is positioned axially within the extension 95 of the housing 94 and has a bevel gear 103 suitably pinned on one end thereof. A bevel gear 103 is in meshing relationship with respect to the gear 99. The shaft 102 is bearinged in a ball bearing 104 positioned within the extension 95. The shaft 102 cooperates with the hollow shaft 106 coaxial with the extension 96 and bearinged therein by means of the ball bearing 107. The shaft 106 is provided with a recess 108 which engages a keyway 109 in the shaft 102 to provide a splined joint between the shafts 106 and 102. The opposite end of the shaft 106 carries a bevel gear 110 suitably secured to the shaft 106 which is in meshing relationship with a bevel gear 111 secured to the platen shaft 47.

As previously mentioned the carbon handling device 25 is floated upon the tie bar 22 by suitable anti-friction members. Specifically, the carbon handling device 25 is carried upon a frame 115 which has a pair of rollers 116 and 117 adapted to rest upon the upper face of the tie bar 22. A roller 118 engages the lower face of the tie bar 22 and thereby provides a 3-point suspension for the frame 115. The frame 115 extends downwardly behind the platen operating mechanism and has a roller 119 positioned on the lower edge thereof. The roller 119 engages a channel 120 suitably secured to the vertical side frame 21 and the clutch 11 (as shown in Figure 1). The roller 119 cooperating with the channel 120 provides means to prevent rotation of the frame 115 upon the tie bar 22. The carbon handling device 25 is carried upon the frame 115 by the bracket 54 as previously described.

The frame 115 is free to reciprocate upon the tie bar 22. This frame, however, is interconnected with the carriage 42 of the typing machine 40 through means of the platen driving mechanism 35. A rod 122 is secured to the frame 115 by means of shoulders 123. The rod 122 extends through an opening in the bracket 121 extending from the platen driving mechanism 35. A helical spring 124 is positioned between the shoulder 123 and a collar 125 slidably positioned upon the rod 122. A helical spring 126 is positioned between the bracket 121 and a washer 127 secured upon the end of the rod 122. The springs 124 and 126 provide a resilient shock absorbing system between the carriage 42 of the typing machine 40 and the frame 115 so that the quick motions of the carriage 42 are not transmitted directly to the frame 115, thus eliminating the necessity of providing a power means suitable for imparting a quick start and stop motion to the mass of the frame 115 and the carbon handling device 25 carried thereby. The carbon handling device 25 is thus carried transversely with the carriage 42 of the typing machine 40 in a smooth floating motion rather than in a jerky motion developed by the carriage 42.

In order to control the rotation of the platen 36 and thus to control the line spacing for typing upon the web 60, a control mechanism is interpositioned between the clutch 11 and the shaft 30. The control mechanism also is adapted to control the forward advancement of the paper web through the machine to a predetermined tear off line so that repeated forms on a continuous web can be removed. The control mechanism is also constructed and arranged to permit reversal or backing out of the paper web in order to position the carbon sheets upon the carbon handling device in a manner to prevent a forward motion of the carbon sheets when the paper web is advanced to the position wherein the form which has just been completed is adjacent the tear off knife.

The control mechanism consists of the line spacing and sheet length controlling member 17. This member 17 is in the form of a gear to the extent that the periphery thereof is provided with a series of adjacent parallel slots 128 extending transversely of the member. The member 17 being secured upon the shaft 16 is rotated with the shaft 16 whenever the same is driven by the clutch 11.

A rocker arm 130 is pivoted upon a pin 131 secured within a stud 132 mounted upon the casing 61 of the clutch 11 (see Figures 14 and 15). A pawl 133 is pivoted upon a pin 134 upon the upper end of the rocker arm 130 while a pawl 135 is pivoted on a pin 136 upon the lower end of the rocker arm 130. Helical springs 137 provide a balanced system maintaining the pawl 133 in a predetermined position, while springs 138 provide a balanced spring system for maintaining the pawl 135 in a predetermined position. Set screws 139 are provided in the rocker arm 130 for adjusting the tension of the springs 137 and 138 to provide the necessary balance therebetween. The pawls 133 and 135 are adapted to cooperate with keys 140 positioned in the slots 128 upon the line spacing control member 17 for actuating the rocker arm 130 in a manner hereinafter described.

A secondary lever 141 is pivotally carried upon the pin 131 and is provided with a pin 142 which extends into a hole 143 in the rocker arm 130. The secondary lever 141 is connected by means of the link 212 to a cam plate 144 pivoted at 145. The cam plate 144 is connected to a link 146 which is secured to a rod 147 by means of an interconnecting link 148. The rod 147 has a link 149 secured to the opposite end thereof which has a bar 150 pivotally secured to the free end of the link 149, as indicated at 151. The bar 150 is provided with a recess 152 in one side thereof which engages a cylindrical member 153 provided upon the side wall of the control buttons 51 and 52 (see Figure 26).

As shown in Figures 14, 16 and particularly in Figure 3, the cam plate 144 is provided with a cam surface 154 which substantially forms a V in the edge thereof. The cam surface 154 terminates in the sharp edges 155 and 156 from which cam surfaces 157 and 158 extend in an opposite direction to the cam surface 154. An arm 159 is pivotally mounted upon a pin 160 extending from the casing 61 of the clutch 11. The arm 159 has a roller 129 which engages the cam surface heretofore described and is retained in engagement with that surface by means of a torsion spring 161. The arm 159 in cooperation with the cam plate 144 provides means for developing a snap acting movement in the operating mechanism in a manner hereinafter described.

A control actuating mechanism is provided for shifting the pawl 133 transversely with respect to the periphery of the line spacing member 17 in order to bring the pawl 133 into alignment with the median line of the transverse dimension of the member 17 for reasons which will be hereinafter explained. This mechanism consists of a vertically positioned rod 162 rotatably mounted within suitable brackets 163 extending from the side wall of the clutch 11 (see Figure 24). Opposite ends of the rod 162 are provided with arms 164 and 165 which form a bellcrank lever. The arm 164 engages a rod 166 slidably positioned within the studs 132 and 167 extending from the casing of the clutch 11. The opposite end of the rod 166 engages the rocker arm 130 to transversely move the same with respect to the line spacing member 17. The pin 142 extending from the secondary lever 141 permits the transverse shifting of the rocker arm 130 without losing the driving connection between the rocker arm 130 and the actuating lever system extending from the cam plate 144.

The arm 165 engages the end of a reciprocating rod 168 positioned within the casing 169 provided for the control actuating buttons 50, 51 and 52. A control actuating button 59 is positioned upon the end of the rod 168.

A helical spring 170 is positioned between the rocker arm 130 and an enlarged head 171 provided on the pivot pin 131 (see Figure 15), whereby the rocker arm 130 is normally maintained in the position shown in Figure 15 against the end of the rod 166. The rod 166 is prevented from movement in a leftward direction as viewed in Figure 24 by means of a stop pin 172 provided on the arm 168 which engages a transverse partition 178 provided in the casing 169.

The stop button controls 51 and 52 are mounted upon a common U-shaped lever 173 which is pivoted at 174 to the casing 169. A pair of ears 175 extend from the arm 173 and are adapted to engage the under side of a leaf spring 176 opposite ends of which are secured to the casing 169. The leaf spring 176 centralizes the position of the control buttons 51 and 52 (as shown in Figure 25). The stop button control 50 extends through the front face of the casing 169 for operation in a straight reciprocatory motion.

The arm 173 is provided with a cylindrical pin 153 previously mentioned for engaging the recess 152 in the arm 150. The arm 150 rests upon a set screw 177 threaded through a partition 178 within the casing 169. The recess 152 is provided with a V-shaped forward and rear wall, 179 and 180 respectively. The sharp edge of the V when in normal position (as shown in Figure 25) is arranged to be at or slightly below the axial center of the pin 153. When one of the push buttons 51 or 52 has been pressed to pivot the arm 173 about the pivot 174 the axial center of the pin 153 drops below the sharp edge of the V-shaped walls 179 and 180 whereby any excess movement which is imparted to the rod 150 through any accidental means would cause the rod 150 to rise over the pin 153 to prevent jamming of the operating mechanism. The set screw 177 is provided for adjusting the horizontal relationship between the sharp edge of the V- shaped walls 179 and 180 with respect to the axial center of the pin 153.

The motor 10 drives the clutch mechanism 11 through means of a friction coupling 185. This coupling 185 (see Figure 30) consists of a flywheel 186 and receives the end of the motor shaft 190. The forward face of the flywheel 186 is provided with a boss 191 which has a finished surface thereon to engage a leather key 192 positioned within a slot 193 provided in a coupling member 194 journaled upon the motor shaft 190. The coupling member 194 is secured to the motor shaft 190 by means of the set screw 195. The face of the coupling member 194 is provided with a cylindrical recess 196 which is just slightly larger in diameter than the boss 191 on the face of the flywheel 186. The leather key 192 is provided with a hole 197 through which the motor shaft 190 extends.

The coupling member 194 is advanced toward the face of the boss 191 on the flywheel 186 until the face of the leather key 192 is in tight surface engagement with the surface of the boss 191. The set screw 195 is then tightened upon the motor shaft 190 to secure the coupling member 194 in position. This arrangement provides a friction drive from the motor to the clutch which permits slippage between the motor drive and the clutch should the clutch become jammed.

The clutch 11 and the motor 10 are secured to a common mounting plate 198. The clutch 11 is provided with three extending legs 199 which are secured to the mounting plate 198 by means of the screws 200. The motor 10 is supported upon the mounting plate by means of the rubber grommets or blocks 201. Two of these support members are provided for positioning the motor upon the mounting plate 198. A rubber grommet 202 is provided adjacent the bottom surface of the mounting plate 198 and a screw 203 extends through the rubber mounting members 202 and 201 into threaded engagement with the motor 10.

The rubber mounting members 201 and 202 provide a certain amount of resiliency to the mounting means so that the shaft 190 of the motor can be properly aligned with the bore 189 provided in the flywheel 186. By either tightening or loosening the screws 203 the motor shaft 190 can be shifted vertically or angularly with respect to the vertical, limited only by the degree of compressibility by the rubber mounting members 201 and 202. Such a mounting provides a very accurate method of aligning the motor shaft 190 with the driving shaft 64.

The friction drive device just described provides a safety feature between the motor 10 and the clutch 11. An additional safety device is provided between the clutch 11 and the gear 15. This device (see Figure 1) consists of a friction disc 204 retained in engagement with the gear 15 by means of the clutch plate 205 and a leaf spring 206. Tension is applied to the leaf spring 206 by means of the bolt 207 threaded upon the end of the shaft 16. The clutch 11 thus has a safety element on both sides thereof to protect the delicate operating mechanism.

In Figures 3 to 13 inclusive there is shown a diagrammatic and simplified arrangement of the operating mechanism of this invention showing certain of the elements in various positions in their operation. By referring to these figures in the following description the full operation of the device will become apparent.

As previously mentioned the controlling device of this invention is particularly adaptable for controlling the operation of the platen of a typewriter for advancing a continuous web of repeated forms through the typewriter in a manner that preselected lines upon the forms can be automatically brought into alignment with the typing bars, the apparatus being constructed and arranged so that the selected lines of the repeated forms will be brought into alignment with the typing bars in a selected sequence, the sequence being repeated for each of the forms as typing proceeds upon the various forms. In addition, the apparatus is adapted to reverse the motion of continuous web forms to permit release of sheet carbon and to again advance the continuous web to bring the bottom edge of the typed form adjacent a tear off blade 210 so that the typed form can be torn from the continuous web. All of these operations are automatically carried out after being initiated by means of push button controls.

In order to set the typewriter platen controlling device for typing a particular form and particular lines on that form the line spacing keys 140 are positioned within the teeth or grooves 128 of the control wheel 17. The line spacing keys 140 are positioned on the left hand side of the wheel 17 (as viewed in Figure 3), key 140a representing the last line spacing key for the form. Since sheet carbon is used between the adjacent forms of the continuous web the paper web must be reversed in its motion to permit release of the carbon from between the forms. A key 140b is positioned upon the right hand side of the wheel 17 and is adapted to engage the lower pawl 135 to stop the reversing motion when the carbon has been moved upon the carbon handling device 25 to a position that it is free from the paper webs. The paper web must then be advanced to permit the bottom edge of the form to be brought adjacent to the tear off knife 210. A tear off key 140c is positioned in the center line of the periphery of the wheel 17 and is adapted to engage the upper pawl 133 to stop the mechanism when the bottom edge of the form is adjacent the tear off knife 210. The keys 140, 140a, 140b and 140c, as set up in Figure 3, are positioned in their proper relative positions for automatically controlling the movement of the platen of the typing machine 40 for properly moving the paper web therein.

Figures 4 to 8 diagrammatically represent the respective operations produced by the typewriter controlling device. Figure 4 shows the control wheel 17 in position to start a typing operation upon a form. The uppermost key 140 has just actuated the pawl 133 to stop the paper web at the heading line or first line of typing upon the form. The electric motor 10 is rotating continuously during the operation of the machine, the driving motion being interrupted by the clutch 11.

To advance the web 60 to the next line of typing the advance button 51 is pressed downwardly thereby pivoting the arm 173 about the pivot pin 174 to shift the bar 150 in a forward direction (as viewed in Figure 3). Shifting of this bar 150 transmits rotary motion to the shaft 147 to cause the links 146 and 148 to push upwardly upon the cam plate 144 and thus rotate the shaft 84 of the clutch 11.

When the cam plate 144 is rotated in an upwardly direction two simultaneous operations occur. The T-bar 83 of the clutch 11 is rotated to permit the clutch control bar 80 to advance and thereby cause engagement of the clutching mechanism 70 to drive the gear 14 and thus the shaft 16 and the control wheel 17. This driving motion is transmitted through the gear train, 26, 27, 28 and 29, to the driving rod 30 and thus to the platen driving mechanism 35 for rotating the platen to advance the paper web 60.

The second operation initiated by the rotation of the cam plate 144 consists of transmitting motion through the link system from the cam plate 144 to the rocker arm 130 to cause the rocker arm 130 to rotate in a forward direction (as viewed in Figure 3) thereby bringing the pawl 133 adjacent the control wheel 17.

A snap action is provided for this motion and for instantly engaging the clutch mechanism by means of the cam surface 154 on the cam plate 144. Movement of the push button 51 rotates the cam plate 144 to bring the edge 155 of the cam surface 154 adjacent the roller 129 whereby the roller 129 throws the cam plate 144 over center and rides upon the face 157. The spring 161 provides the force required for the snap acting operation.

When the pawl 133 is brought into adjacent relationship with respect to the wheel 17 the forward edge of the pawl 133 is positioned ahead of the next successive key 140. The clutch 11 has been engaged whereby the wheel is being driven in a forward direction represented by the arrow on the wheel 17 of Figure 3, and by the arrows on Figures 9 to 13. The key 140 engages the pawl 133 to cause the rocker arm 130 to move in a rearward direction (as shown in Figure 10). The rearward motion of the rocker arm 130 causes the lever system between the rocker arm and the cam plate 144 to move the cam plate in a forward direction (as viewed in Figure 3) until the roller 129 is adjacent the edge 155 of the cam surface 154. Slight additional movement of the cam plate 144 then causes the roller 129 to engage the declining surface 154 and rapidly move the cam plate to open the clutch mechanism and complete the returning movement of the rocker arm 130. The position of the rocker arm 130 with respect to the key 140 is shown in Figure 11.

When the pawl 133 is again advanced by the rocker arm 130 due to movement of the push button 51 the edge of the pawl 133 may strike the upper edge of the key 140 (as shown in Figure 12). The balancing springs 137 permit the pawl to move in a rearward direction until the key 140 is cleared, the lower spring 137 then moving the pawl into the position shown in Figure 13 so that the next subsequent key 140 may engage the pawl 133 to return the rocker arm 130 as heretofore described.

Each time the operator of the typing machine desires to line space the machine the push button 51 is pressed and the function heretofore described produced, each of the keys 140 halting the forward advancement of the paper web at the proper line for typing.

Since sheet carbon is used between the adjacent sheets of the web 60 it is now necessary to reverse the motion of the paper web to permit release of the carbon sheets. The reverse button 52 is now pressed to cause the bar 150 to move in a rearward direction and therefore transfer motion to the cam plate 144 to rotate the same downwardly and thus permit the control bar 92 of the clutch 11 to permit engagement of the clutching mechanism 89 whereby the gear 14 will be rotated in a reverse direction and thus reverse rotation will be transmitted to the platen through the power driving system heretofore described. The reverse rotation of the platen will continue until the carbon reverse key 140 strikes the lower pawl 135 which functions in the same manner as the pawl 133 to halt rotation of the control wheel 17 and the platen 36 of the typing machine. The carbon sheets will now be in position to be retained by the carbon handling device to permit the adjacent sheets of the paper web 60 to be advanced through the typing machine to a position that the lower edge of the form just typed will be adjacent the tear off knife 210.

To control the position of the paper web in this operation the push buttons 50 and 51 are simultaneously depressed. The push button 51 initiates the advancing motion of the paper web in the manner heretofore described. Rearward motion of the push button 50 causes the rocker arm 130 to be shifted to the right (as viewed in Figure 3 and as shown in position in Figure 18) to bring the pawl 133 into alignment with the center line of the wheel 17. The forward motion of the wheel 17 continues until the tear off key 140c strikes the pawl 133 and causes disengagement of the clutch 11 in the manner heretofore described.

It will of course be understood that the position of the tear off key with respect to the carbon reverse key is such that the tear off key will not be positioned between the pawls 133 and 135 when the carbon reverse key 140b is adjacent the pawl 135. If the tear off key 140c should be positioned between the pawls the machine would not advance to the tear off line but rather would advance by a short distance and the tear off key 140c would stop the machine.

After the control wheel 17 has been rotated to bring the tear off key 140c adjacent the pawl 133 to stop the advancement of the paper web through the machine the top edge of the next successive form will be adjacent the tear off knife 210, the first key 140 representing the top edge of the form sheet. The form sheet will be in proper position to permit indexing of the web to the first typing line represented by the second key 140, but the control wheel 17 will not be in proper position if a short form is being used in the machine. To bring the control wheel 17 into the proper position the paper release bar 46 of the typing machine 40 is moved manually to release the pressure rollers from the paper web passing under the platen 36. The platen 36 can now be rotated without advancing the paper web through the machine. The advance button 51 is now depressed to rotate the control wheel 17 until the first key 140 strikes the pawl 133 to stop the machine. This operation resets the wheel 17 so that subsequent line spacing will be accomplished in the same sequence as upon the form which was just removed from the machine.

It is of course understood that after the wheel 17 has been preset to its initial starting position that the carbon sheets will be released from the carbon handling device 25 so that they can advance through the machine with the paper web 60 when it is advanced to the first typing line by the first indexing operation.

This application is a division of my copending application, Serial No. 406,623, filed August 13, 1941, which matured as Patent No. 2,354,082, July 18, 1944.

While the apparatus disclosed and described herein is a preferred form of the invention, yet, it is to be understood that the construction and arrangement of the apparatus can be modified without departing from the spirit of the invention; and that all such modifications are intended to be included herein which fall within the scope of the appended claims.

Having thus fully described my invention what I claim as new and desire to secure by Letters Patent is:

1. An apparatus for controlling the movement of a plurality of webs having repeated form faces in juxtaposed relationship and having individual sheets of carbon positioned between adjacent forms comprising a power source, means for controlling connection of said power source to the platen of a typing machine, means for regulating the operation of said controlling means including means for controllably predetermining the amount of advancement of said platen for sequential line spacing, means for controlling reverse rotation of said platen to permit release of said carbon, and means for regulating the forward rotation of said platen to advance said webs to a position in the typing machine to permit removal of the typed form from said webs.

2. An apparatus for controlling the movement of a plurality of webs having repeated form faces in juxtaposed relationship and having individual sheets of carbon positioned between adjacent forms comprising a power source, means for controlling connection of said power source to the platen of a typing machine, means for regulating the operation of said controlling means including means for the desired predetermining advancement of said platen for sequential line spacing, means for controlling reverse rotation of said platen to permit release of said carbon, means for regulating the forward rotation of said platen to advance said webs to a position in the typing machine to permit removal of the typed form from said webs, and manually actuated means for initiating operation of the means connecting said power source to said platen and said platen control means.

3. In combination, a typing machine having a reciprocable platen, means for providing power driven rotation of said platen having a power driven shaft arranged parallel with respect to said platen, means slidable upon said power driven shaft for drivably connecting said shaft to said platen for rotating said platen and reciprocable therewith, a stationary bar parallel to said power driven shaft and said platen, a carbon paper handling device carried upon said stationary bar and movable longitudinally thereof, and means resiliently connecting said paper handling device to said means which is slidable upon said power shaft for moving said paper handling device in unison with said platen.

4. In combination, a typing machine having a reciprocable platen, means for providing power driven rotation of said platen having a power driven shaft arranged parallel with respect to said platen, means slidable upon said power driven shaft for drivably connecting said shaft to said platen for rotating said platen and reciprocable therewith, a stationary bar parallel to said power driven shaft and said platen, a carbon paper handling device carried upon said stationary bar and movable longitudinally thereof, and means resiliently connecting said paper handling device to said means which is slidable upon said power shaft for moving said paper handling device in unison with said platen, said resilient means being constructed and arranged to absorb the shock of rapid platen motion to permit smooth motion of said paper handling device.

5. An apparatus for controlling the movement of a plurality of webs through a typing machine and arranged in juxtaposed relationship and having loose carbon sheets disposed between adjacent webs comprising, means for supporting a plurality of webs with individual loose carbon sheets therebetween, a power source, means adapted to drivingly connect said power source to the platen of a typing machine including means for controlling connection and disconnection of said power source, means for predeterminately controlling the amount of advancement of said platen for sequential line spacing, means for controlling reverse rotation of said platen for retracting the webs and carbon sheets from the typing machine to cause the carbon sheets to be detained upon the supporting means for the same, and means for controlling the forward advancement of the webs without movement of the carbon sheets for ejecting a predetermined length of web from the typing machine.

6. An apparatus for controlling the movement of a plurality of webs through a typing machine and arranged in juxtaposed relationship and having loose carbon sheets disposed between adjacent webs comprising, means for supporting a plurality of webs with individual loose carbon sheets therebetween, a power source, means adapted to drivingly connect said power source to the platen of a typing machine including means for controlling connection and disconnection of said power source, means for controlling the advancement of said platen for subsequential line spacing, means for controlling reverse rotation of said platen for retracting the webs and carbon sheets from the typing machine to cause the carbon sheets to be detained upon the supporting means for the same, means for controlling the forward advancement of the webs without movement of the carbon sheets for ejecting a predetermined length of web from the typing machine, manually actuated means for controlling connection of said power source to advance said platen for subsequential line spacing and for reverse retraction rotation of said platen, and independent manually actuated means for controlling the advancement of said platen to predetermine the length of the web ejected from the typing machine.

7. An apparatus for controlling the movement of a plurality of webs through a typing machine and arranged in juxtaposed relationship and having loose carbon sheets disposed between adjacent webs comprising, means for supporting a plurality of webs and cooperating carbon sheets, a power source, clutch means driven by said power source and adapted for reversely driving a power shaft, means connected to said clutch power shaft for controlling the degree of rotation of the platen of a typing machine, means drivingly connecting said last mentioned means with the platen of a typing machine, means actuated by said platen controlling means for disconnecting said clutch means, manually actuated means for actuating said clutch means to connect said power source with said clutch shaft to drive said platen controlling means for advancing said platen in subsequential line spacing thereof, said manually actuated means also actuating said clutch means to reversely connect said power source with said clutch shaft to drive said platen controlling means for actuating the web from the typing machine, and independent manually actuating means for controlling the forward advancement of said platen controlling means to eject a predetermined length of web from the typing machine.

8. An apparatus for controlling the movement of a plurality of webs through a typing machine and arranged in juxtaposed relationship and having loose carbon sheets disposed between adjacent webs comprising, means for supporting a plurality of webs and cooperating carbon sheets, a power source, clutch means driven by said power source and adapted for reversely driving a power shaft, means connected to said clutch power shaft for controlling the degree of rotation of the platen of a typing machine, means drivingly connecting said last mentioned means with the platen of a typing machine, means actuated by said platen controlling means for disconnecting said clutch means, manually actuated means for actuating said clutch means to connect said power source with said clutch shaft to drive said platen controlling means for advancing said platen in subsequential line spacing thereof, said manually actuated means also actuating said clutch means to reversely connect said power source with said clutch shaft to drive said platen controlling means for actuating the web from the typing machine, and independent actuating means adapted to operate simultaneously with said first mentioned manually actuated means, thereby, connecting said power source to said clutch shaft to drive said platen controlling means for advancing a predetermined length of web through the typing machine as controlled by said second mentioned manually actuated means.

9. A manifolding apparatus adapted to be used in combination with a typing machine comprising a frame, a power source supported upon said frame, a drive shaft bearinged in said frame, means drivingly interconnecting said power source and said drive shaft, drive means carried upon said drive shaft and keyed thereto for transmitting rotation from said drive shaft to the platen of a typing machine, said drive means being constructed and arranged for sliding upon said drive shaft to move with the platen of a typing machine, a support member carried upon said frame parallel to said drive shaft, a carbon paper handling device supported upon said support member, and means connecting said carbon paper handling device to said drive means for moving said handling device with said drive means and therefore with the platen of a typing machine associated therewith.

10. A manifolding apparatus adapted to be used in combination with a typing machine comprising a frame, a power source supported upon said frame, a drive shaft bearinged in said frame, means drivingly interconnecting said power source and said drive shaft, drive means carried upon said drive shaft and keyed thereto for transmitting rotation from said drive shaft to the platen of a typing machine, said drive means being constructed and arranged for sliding upon said drive shaft to move with the platen of a typing machine, a support member carried upon said frame parallel to said drive shaft, a carbon paper handling device supported upon said support member, means extending from said drive means adjacent said carbon paper handling device, and spring means disposed between said extending means and said carbon paper handling device to absorb shock of platen movement and prevent transmission thereof to said carbon paper handling device.

11. A manifolding apparatus adapted to be used in combination with a typing machine comprising a frame, a power source supported upon said frame, a drive shaft bearinged in said frame, means drivingly interconnecting said power source and said drive shaft, drive means carried upon said drive shaft and keyed thereto for transmitting rotation from said drive shaft to the platen of a typing machine, said drive means being constructed and arranged for sliding upon said drive shaft to move with the platen of a typing machine, a support member carried upon said frame parallel to said drive shaft, a carbon paper handling device supported upon said support member, and means connecting said carbon paper handling device to said drive means for moving said handling device with said drive means and therefore with the platen of a typing machine associated therewith, said last mentioned means including shock absorbing means to prevent direct transmission of the movement of the platen of a typing machine to the carbon paper handling device.

12. A manifolding apparatus adapted to be used in combination with a typing machine comprising a frame, a power source supported upon said frame, a drive rod bearinged in said frame, means drivingly interconnecting said power source and said drive rod including means for controlling either direction of rotation of said drive rod, drive means slidably supported upon said drive rod having means keyed to said drive rod for transmitting rotation therefrom to the platen of a typing machine and reciprocable therewith during operation thereof, a supporting bar carried upon said frame parallel to said drive rod, an auxiliary frame providing a carbon paper handling device supported upon said support bar, and means connecting said auxiliary frame to said drive means for movement therewith and therefore with the platen of a typing machine.

13. A manifolding apparatus adapted to be used in combination with a typing machine comprising a frame, a power source supported upon said frame, a drive rod bearinged in said frame, means drivingly interconnecting said power source and said drive rod including means for controlling either direction of rotation of said drive rod, drive means slidably supported upon said drive rod having means keyed to said drive rod for transmitting rotation therefrom to the platen of a typing machine and reciprocable therewith during operation thereof, a supporting bar carried upon said frame parallel to said drive rod, an auxiliary frame providing a carbon paper handling device supported upon said support bar for movement in parallel relation thereto, means for supporting said auxiliary frame comprising a pair of rollers carried by said auxiliary frame and having the axes thereof disposed angularly with respect to one another and adapted to engage an upper surface of said support bar, a roller carried by said auxiliary frame adapted to engage an under surface of said support bar, means preventing rotation of said auxiliary frame upon said support bar, and means connecting said auxiliary frame to said drive means for movement therewith and therefore with the platen of a typing machine.

CLAYTON E. WYRICK.